US011913911B2

(12) United States Patent
El Chamie et al.

(10) Patent No.: US 11,913,911 B2
(45) Date of Patent: Feb. 27, 2024

(54) SYSTEM AND METHOD FOR DUAL PULSE-ECHO SUB-SURFACE DETECTION

(71) Applicant: Raytheon Technologies Corporation, Farmington, CT (US)

(72) Inventors: Mahmoud El Chamie, Rocky Hill, CT (US); Amit Surana, Newington, CT (US); Christoph Schulze, Albany, CA (US); Ayman Elkfrawy, Oakland, CA (US); Matthew L. Brantley, Jr., South Glastonbury, CT (US); Ozgur Erdinc, Mansfield, CT (US)

(73) Assignee: RTX Corporation, Farmington, CT (US)

( * ) Notice: Subject to any disclaimer, the term of this patent is extended or adjusted under 35 U.S.C. 154(b) by 316 days.

(21) Appl. No.: 17/352,964

(22) Filed: Jun. 21, 2021

(65) Prior Publication Data

US 2022/0404319 A1 Dec. 22, 2022

(51) Int. Cl.
| | |
|---|---|
| *G01N 29/06* | (2006.01) |
| *G01N 29/44* | (2006.01) |
| *G06N 20/00* | (2019.01) |
| *G01N 29/04* | (2006.01) |
| *G01N 29/265* | (2006.01) |
| *G01N 29/28* | (2006.01) |

(52) U.S. Cl.
CPC ....... *G01N 29/4472* (2013.01); *G01N 29/043* (2013.01); *G01N 29/0645* (2013.01); *G01N 29/265* (2013.01); *G01N 29/28* (2013.01); *G01N 29/4427* (2013.01); *G06N 20/00* (2019.01)

(58) Field of Classification Search
USPC .......................................................... 702/39
See application file for complete search history.

(56) References Cited

U.S. PATENT DOCUMENTS

| | | |
|---|---|---|
| 3,228,234 A | 1/1966 | Marklein |
| 4,805,459 A | 2/1989 | Ferreira |
| 5,445,029 A | 8/1995 | Falsetti et al. |
| (Continued) | | |

FOREIGN PATENT DOCUMENTS

EP 1742047 A1 1/2007

OTHER PUBLICATIONS

Matz et al. "Classification of Ultrasonic Signals". Oct. 2006. International Journal of Materials and Product Technology. vol. 27. Issue 3. pp. 145-155.

(Continued)

*Primary Examiner* — Paul D Lee
(74) *Attorney, Agent, or Firm* — Bachman & LaPointe, P.C.

(57) ABSTRACT

A system for detecting a sub-surface defect comprising a transducer fluidly coupled to a part located in a tank containing a liquid configured to transmit ultrasonic energy, the transducer configured to scan the part to create scan data of the scanned part; a pulser/receiver coupled to the transducer configured to receive and transmit the scan data; a processor coupled to the pulser/receiver, the processor configured to communicate with the pulser/receiver and collect the scan data; and the processor configured to detect the sub-surface defect and the processor configured to have a sub-surface defect confidence assessment and a prioritization for further human evaluation.

10 Claims, 4 Drawing Sheets

(56) References Cited

U.S. PATENT DOCUMENTS

| | | | |
|---|---|---|---|
| 7,966,860 | B2 | 6/2011 | Dijkstra |
| 8,714,018 | B2 | 5/2014 | Oberdoerfer et al. |
| 9,482,645 | B2 | 11/2016 | Freda et al. |
| 10,875,125 | B2 | 12/2020 | Narayanan et al. |
| 10,928,362 | B2 | 2/2021 | Finn et al. |
| 11,619,611 | B2 * | 4/2023 | Jack ................ G01N 29/48 73/625 |
| 2003/0234239 | A1 | 12/2003 | Lee et al. |
| 2006/0117855 | A1 * | 6/2006 | Barshinger ............ G01N 29/28 73/605 |
| 2017/0032281 | A1 | 2/2017 | Hsu |
| 2017/0370885 | A1 * | 12/2017 | Na ................... G01N 29/221 |
| 2018/0043285 | A1 | 2/2018 | Gagnon et al. |
| 2021/0293757 | A1 * | 9/2021 | Lepage ............. G01N 29/262 |
| 2022/0018811 | A1 * | 1/2022 | Al-Hashmy .......... G06V 10/82 |
| 2022/0276207 | A1 * | 9/2022 | Belanger ............ G01N 29/0645 |

OTHER PUBLICATIONS

Guo et al. "Fully Convolutional Neural Network With GRU for 3D Braided Composite Material Flaw Detection". Oct. 2019. IEEE Access. vol. 7. pp. 151180-151188.

Ye et al. "Computerized Ultrasonic Imaging Inspection: From Shallow to Deep Learning". Oct. 2018. Sensors. vol. 7. Issue 11. pp. 3820.

Virkkunen et al. "Augmented Ultrasonic Data for Machine Learning". Journal of Nondestructive Evaluation, vol. 40, No. 4, Jan. 2021, https://doi.org/10.1007/s10921-020-00739-5.

European Search Report and Written Opinion dated Jan. 2, 2023 issued in corresponding EP Application No. 22180255.6.

* cited by examiner

SYSTEM AND METHOD FOR DUAL PULSE-ECHO SUB-SURFACE DETECTION

BACKGROUND

The present disclosure is directed to the improved process of automatic defect recognition for the automatic inspection of engine parts using immersion pulse-echo inspection technology.

Aerospace engine components, may incur defects or imperfections during the manufacturing process. Non-destructive testing (NDT) inspections are performed during different stages of the manufacturing process to identify defective parts. Inspection methods include, but are not limited to, visual inspection, X-Ray, thermography, and ultrasonic testing. It is particularly difficult to inspect components that have an internal structure using only external observations. Forms of flaws such as porosity and inclusions in metallic parts are particularly difficult to detect. These types of defects can grow and damage the part in service. Such internal defects are often detected by some form of excitation of the structure (ultrasonic, thermoacoustic, and the like), sensing of the excitation, and manual interpretation of the sensor signals, see for example FIG. 1. This manual inspection process is tedious, time consuming, and error prone.

What is needed are automated or aided methods for detecting defects.

SUMMARY

In accordance with the present disclosure, there is provided a system for detecting a sub-surface defect comprising a transducer fluidly coupled to a part located in a tank containing a liquid configured to transmit ultrasonic energy, the transducer configured to scan the part to create scan data of the scanned part; a pulser/receiver coupled to the transducer configured to receive and transmit the scan data; a processor in electronic communication with the pulser/receiver, the processor configured to communicate with the pulser/receiver and collect the scan data; and the processor configured to detect the sub-surface defect; a tangible, non-transitory memory configured to communicate with the processor, the tangible, non-transitory memory having instructions stored therein that, in response to execution by the processor, cause the processor to perform operations comprising: receiving, by the processor, the scan data for the part from the transducer; running, by the processor, a flaw detection algorithm; determining, by the processor, a part disposition; the part disposition is based on a confidence system that the processor uses to self-assess the part disposition; and creating, by the processor, a report.

A further embodiment of any of the foregoing embodiments may additionally and/or alternatively include the scan comprises transmitting ultrasonic energy to the part and receiving the ultrasonic energy from the part.

A further embodiment of any of the foregoing embodiments may additionally and/or alternatively include the flaw detection algorithm is based on at least one inspection technique sheet.

A further embodiment of any of the foregoing embodiments may additionally and/or alternatively include determining the part disposition is responsive to at least one of acceptance criteria defined in the technique sheet and the scan data.

A further embodiment of any of the foregoing embodiments may additionally and/or alternatively include the system further comprises providing, by the processor, further instructions to the transducer to maximize a signal-to-noise ratio to localize identified indications, wherein the indications represent at least one of a sensed flaw, defect, and discontinuity in the part.

In accordance with the present disclosure, there is provided a system comprising a computer readable storage device readable by the system, tangibly embodying a program having a set of instructions executable by the system to perform the following steps for detecting a sub-surface defect, the set of instructions comprising: an instruction to receive scan data for a part from a transducer; an instruction to run a flaw detection algorithm; an instruction to determine a part disposition based on a confidence system that the processor uses to self-assess said part disposition; and an instruction to create a report.

A further embodiment of any of the foregoing embodiments may additionally and/or alternatively include the scan data is selected from at least one of C-scans and A-scans.

A further embodiment of any of the foregoing embodiments may additionally and/or alternatively include the flaw detection algorithm is based on at least one inspection technique sheet.

A further embodiment of any of the foregoing embodiments may additionally and/or alternatively include the instruction to determine the part disposition is responsive to at least one of acceptance criteria defined in the technique sheet and the scan data.

A further embodiment of any of the foregoing embodiments may additionally and/or alternatively include the system further comprises an instruction to the transducer to maximize a signal-to-noise ratio to localize identified indications, wherein the indications represent at least one of a sensed flaw, defect, and discontinuity in the part.

In accordance with the present disclosure, there is provided a process for detecting a sub-surface defect by use of a system including a transducer fluidly coupled to a part located in a tank containing a liquid configured to transmit ultrasonic energy, the transducer configured to scan the part to create scan data of the scanned part; a pulser/receiver coupled to the transducer configured to receive and transmit the scan data; a processor coupled to the pulser/receiver, the processor configured to communicate with the pulser/receiver and collect the scan data; and the processor configured to detect the sub-surface defect, a tangible, non-transitory memory configured to communicate with the processor, the tangible, non-transitory memory having instructions stored therein that, in response to execution by the processor, cause the processor to perform operations comprising: receiving, by the processor, the scan data for the part from the transducer, wherein the scan data comprises at least one of C-scan data and A-scan data; running, by the processor, a flaw detection algorithm; determining, by the processor, a part disposition; and creating, by the processor, a report.

A further embodiment of any of the foregoing embodiments may additionally and/or alternatively include the process further comprises: analyzing, by the processor, C-scan data for quality issues, wherein upon an indication that the C-scan data is acceptable, the processor executes an algorithm to identify indications in the scan data.

A further embodiment of any of the foregoing embodiments may additionally and/or alternatively include the process further comprises: analyzing, by the processor, an A-scan associated with the indication as additional scan data to identify quality issues in the scan data.

A further embodiment of any of the foregoing embodiments may additionally and/or alternatively include the process further comprises: detecting, by the processor, that at least one of the C-scan data and the A-scan data is bad, executing, by the processor, an error handling loop to troubleshoot and resolve the quality issues in the scan data.

A further embodiment of any of the foregoing embodiments may additionally and/or alternatively include the process further comprises: detecting, by the processor, that both of the C-scan data and the A-scan data are good, the indication is classified and sorted by a severity value.

A further embodiment of any of the foregoing embodiments may additionally and/or alternatively include the process further comprises: confirming, by the processor, the indication by collecting additional A-scan data at different angulations of the transducer.

A further embodiment of any of the foregoing embodiments may additionally and/or alternatively include the process further comprises: assessing, by the processor, a confirmed indication and providing a disposition for the indication; wherein the disposition comprises a combination of subject-matter-experts that identify features of interest in a detected indication that can be a defect, and a machine learning method that uses historical defect characteristics to get bounds that determine a likelihood of an indication to be a subsurface defect.

Other details of the process are set forth in the following detailed description and the accompanying drawings wherein like reference numerals depict like elements.

DETAILED DESCRIPTION

Figure 1:
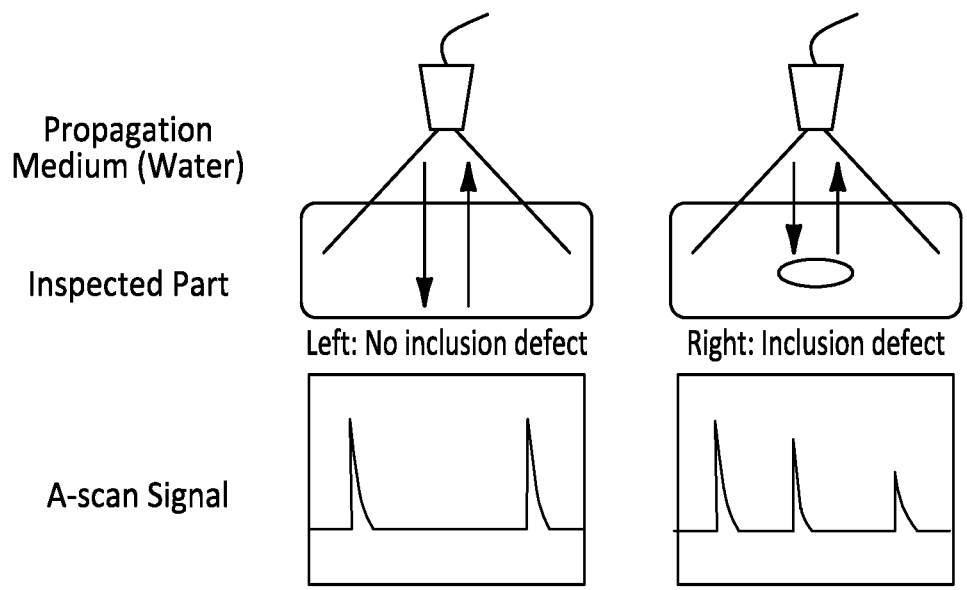
FIG. 1 is a schematic of an exemplary manual inspection system.
Figure 2:
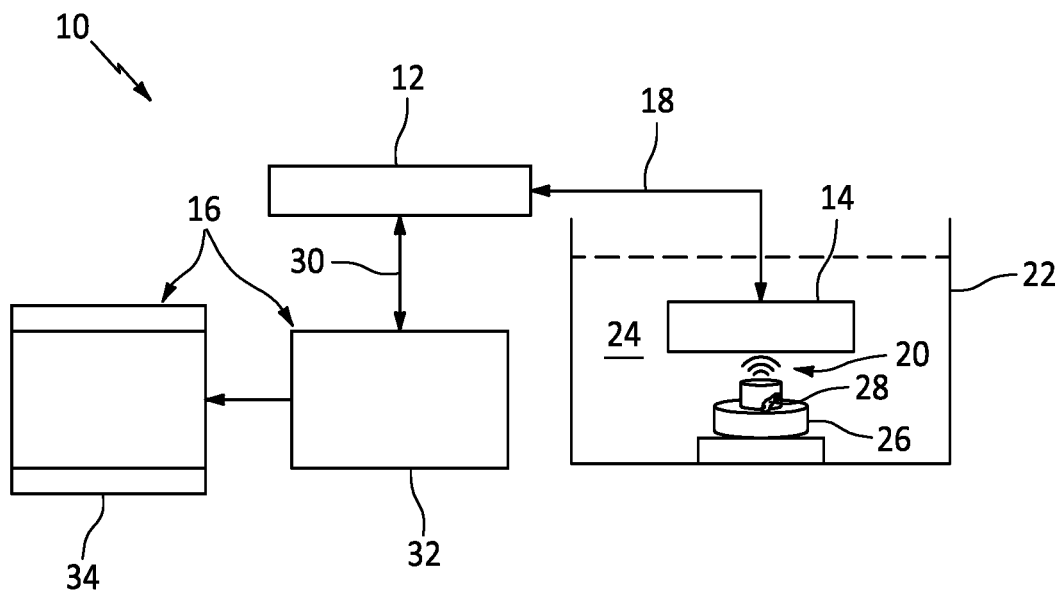
FIG. 2 is a schematic of an exemplary ultrasonic testing inspection system.

Referring now to FIG. 2, the exemplary ultrasonic testing (UT) inspection system 10 is shown. The UT inspection system 10 includes several functional units, such as a pulser/receiver 12, transducer 14, and display devices 16. A pulser/receiver 12 is an electronic device that can produce high voltage electrical pulses 18. Driven by the pulser 12, the transducer 14 generates high frequency ultrasonic energy (sound energy) 20. The sound energy 20 is introduced and propagates in the form of waves through the materials in the UT tank 22, such as water 24, and the part being inspected 26, like an engine disk. When there is a discontinuity 28 in the part 26, such as a crack, located in the wave path, a portion of the energy 20 will be reflected back from the discontinuity 28 surface. The transducer 14 can detect the reflected energy wave. The reflected wave signal is transformed into scan data 30 relayed in the form of an electrical signal 18 by the transducer 14 and relayed to a first processor 32 and displayed on a screen 16 (Computer 1 in FIG. 2). A second processor 34 (Computer 2 in FIG. 2) is configured to automatically analyze the scan data 30 to distinguish between actual part defects and spurious indications of defects.

Figure 3:
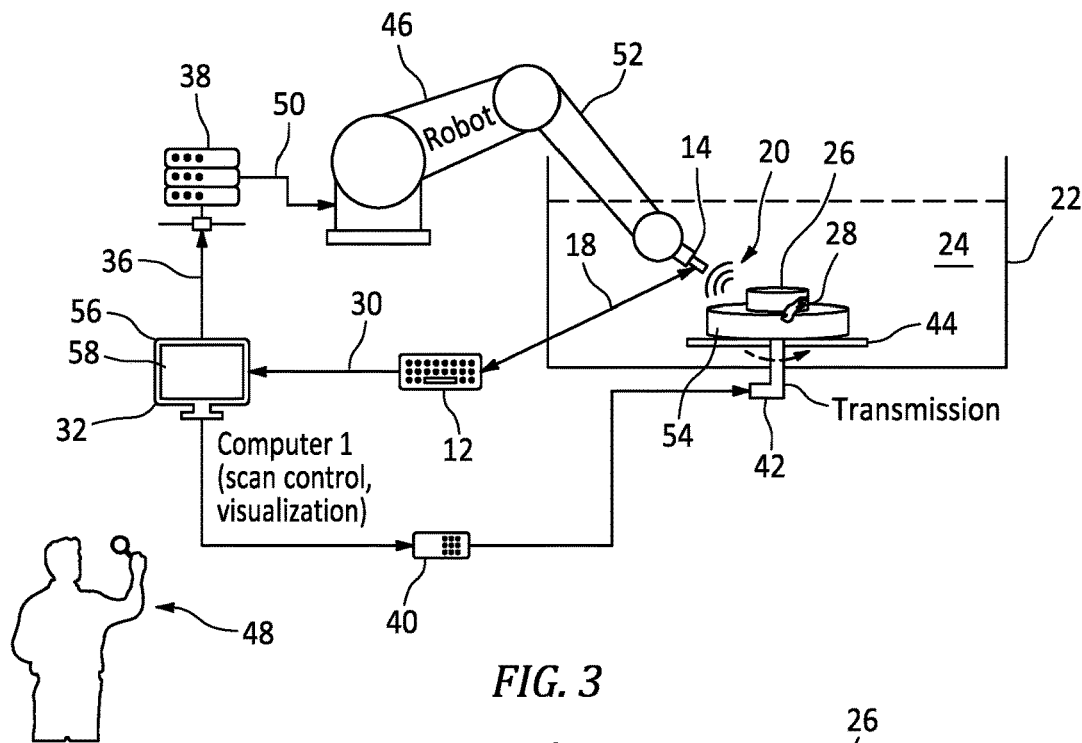
FIG. 3 is a schematic of an exemplary ultrasonic testing inspection system.

A more detailed schematic of the interactions between first processor 32 and the UT tank 22 is shown in FIG. 3. The first processor 32 is responsible for multiple functions. One of those functions includes sending scan plan information 36 to a robot controller 38. The first processor 32 can communicate with a motor controller 40. The motor controller 40 is configured to operate a motor 42 to rotate a turntable 44 supporting the inspected part 26. The first processor 32 can also receive scan signal data 30 from the pulser/receiver 12 received from the transducer 14 coupled to a robot 46 to be displayed for review by an inspector 48.

The scan plan 36 contains instructions 50 for moving a robotic arm 52 and positioning the transducer 14 around the inspected part 26 for collection of scan data 30. The data 30 can be collected by scanning every surface 54 of the part 26 until the totality of surfaces 54 of the part 26 that cover the entirety of the part 26 volume have been scanned. In order to generate a scan plan 36, the inspector 48 configures the scan by setting parameters 56 in a UT tank vendor software 58 installed on the first processor 32. The values of such parameters 56 depend on the inspected part 26; some parameters 56 and their representative values include water path length, that is, the distance between the tip of the transducer 14 and the inspected part 26 of for example, 100 mm.

The pulser/receiver 12 produces outgoing electrical pulses 18 to the transducer 14 and receives/amplifies returning pulses 18 from the transducer 14. The robotic arm 52 aides in the translation (spatial coordinates) and angulation (tilting) of the transducer 14 according to the scan plan 36. A single transducer 14 generates and receives sound wave signals 20 that traverse the liquid medium 24 and the inspected part 26.

Figure 4:
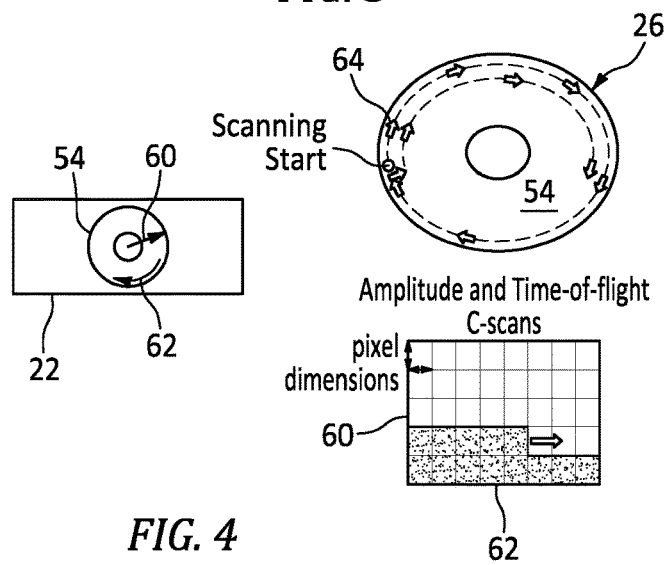
FIG. 4 is a schematic of exemplary surface scanning data generation.

Referring also to FIG. 4, the scan resolution in both index axis dimension 60 and scanning axis dimension 62 is shown. In an exemplary embodiment, a value of 0.5 mm each, a scan direction 64 of moving the transducer 14 from the outer diameter (O.D.) to the inner diameter (I.D.) of the inspected part 26, the rotation speed of the turntable 44 supporting the part 26, of for example 15 mm/s, and the gate (that is, an electronic means of selecting a segment of the time base range for monitoring or further processing) start and end positions of for example 5 mm and 30 mm, respectively, as well as its trigger level of 50% (that is, amplitude level above or below which the inspected part 26 is accepted or rejected) can be predetermined. The scanning procedure of one part surface 54 to generate the C-scan is depicted in FIG. 3.

One of the main uses of the UT inspection system 10 is for detecting and evaluating flaws or defects in physical parts 26, such as turbine components of gas turbine engines. A defect can be defined as a region of a material or a structure that has different physical properties from its neighborhood (causing a discontinuity in that region), and those differences in properties are not intended during manufacturing. Defects can occur during manufacturing or if the physical properties are altered over time. Some examples of defects detected by ultra-sonic inspection are inclusions (e.g., non-metallic, metallic, reactive inclusions), or cracks. An indication is how those defects show up in the signals coming out from the immersion pulse-echo ultrasonic system. Not all indications detected are defects because there might be false positives, but the premise from the inspection method is that all defects conforming to NDT specifications are detected as indications. Defect identification is performed by scanning parts 26 by pulser/receiver 12, transducer 14, and display devices 32, 34. Ultrasonic data 30 of the scanned part 26 can be formatted into three presentations: A-scan, B-scan, and C-scan. The A-scan presentation is a one dimension, 1-D plot that displays the amount of received ultrasonic energy (vertical axis) as a function of time (horizontal axis). The B-scan presentation is a cross-sectional, two dimension, 2-D profile of the time-of-flight (time travel or depth) of the sound energy in the vertical axis and the linear position of the transducer 14 in the horizontal axis. Lastly, the C-scan presentation is also a 2-D plot that captures a plan-type view of the location and size of the part; plots for either relative signal amplitude or time-of-flight may be generated. Multiple presentation scans can be used together for more accurate determinations of the condition of the part 26.

Referring also to FIG. 5*a*, an illustration of the inspection system 10, is shown. The sensitivity and the detection capability of the system 10 can be a result of the technology used for generating the inspection data. Detection of the subsurface defects 28 from the inspection data 30 is primarily performed by human inspectors 48 which is a labor intensive and error prone process leading to inconsistencies and cost of poor quality.

Figure 5:
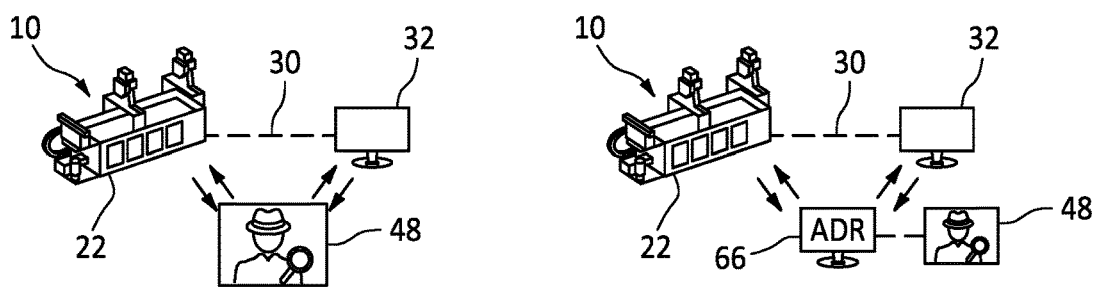
FIGS. 5(a) and 5(b) is a schematic comparison of a human based inspection system and an exemplary automatic defect recognition system.

FIG. 5(*b*) shows a system and method for automatic defect recognition (ADR) processor 66 for automatic inspection of engine parts 26 using immersion pulse-echo inspection technology as described above. The automatic defect recognition processor 66 can include one or more processors 66 (e.g., computer systems having a central processing unit and memory) for recording, processing and storing the data received. The processor 66 may include a general-purpose processor, a digital signal processor (DSP), an application specific integrated circuit (ASIC), a field programmable gate array (FPGA) or other programmable logic device, discrete gate or transistor logic, discrete hardware components, or any combination thereof.

Figure 6:
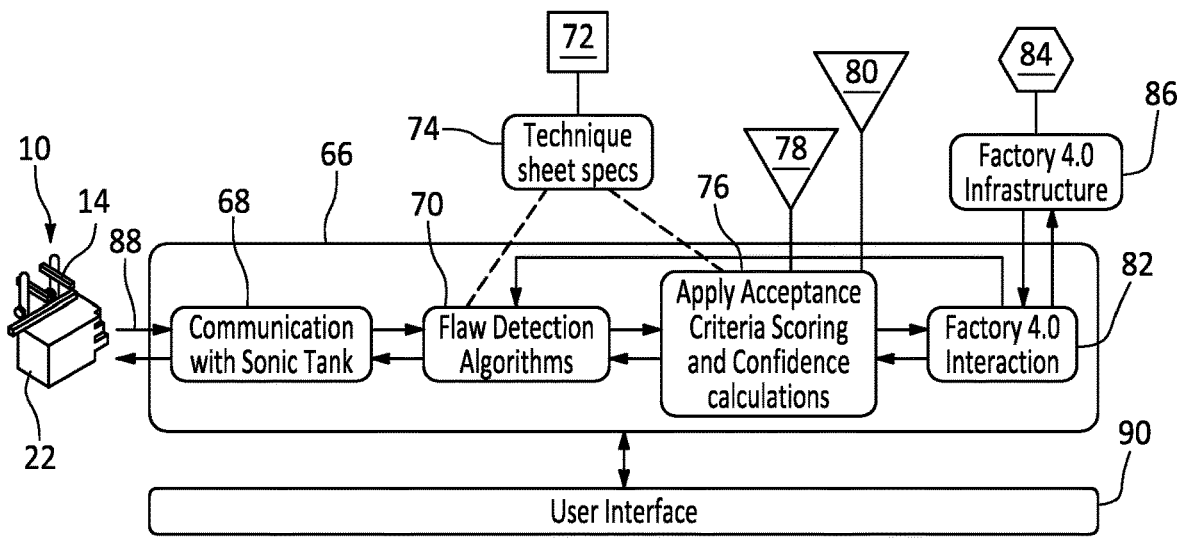
FIG. 6 is a schematic of exemplary automatic defect recognition system modules.

The process is shown in FIG. 6 where the ADR processor 66 uses the communication with Sonic Tank block 68 to initiate the collection of data 30 from the inspection of the part 26 in the tank 22. After the data collection, the ADR processor 66 runs an indication (potential flaws) flaw detection algorithm 70 based on at least one inspection technique sheet 72. The ADR processor 66 further provides instructions to the transducer 14 to maximize a signal-to-noise ratio to localize identified indications more accurately. The indications can represent a sensed flaw or defect or discontinuity 28 in the part 26. A technique sheet 72 can be provided as an external input to the ADR processor 66 through the technique sheet specs block 74. Using the acceptance criteria defined in the technique sheet 72 and detected indications data 30, at block 76 the ADR processor 66 can issue a part level disposition 78 and automatically fills out quality notification (QN) reports 80 that can be communicated to the Factory 4.0 at block 82 for storage and archiving in quality databases 84 of the factory infrastructure 86. At certain points during the inspection, the ADR processor 66 can involve the human inspector 48 for assistance or/and verification of the detected indications 88. This is accomplished based on a confidence system that the ADR processor uses to self-assess its own disposition. The interaction of the human inspector with the ADR processor 66 is through a user interface 90.

Figure 7:
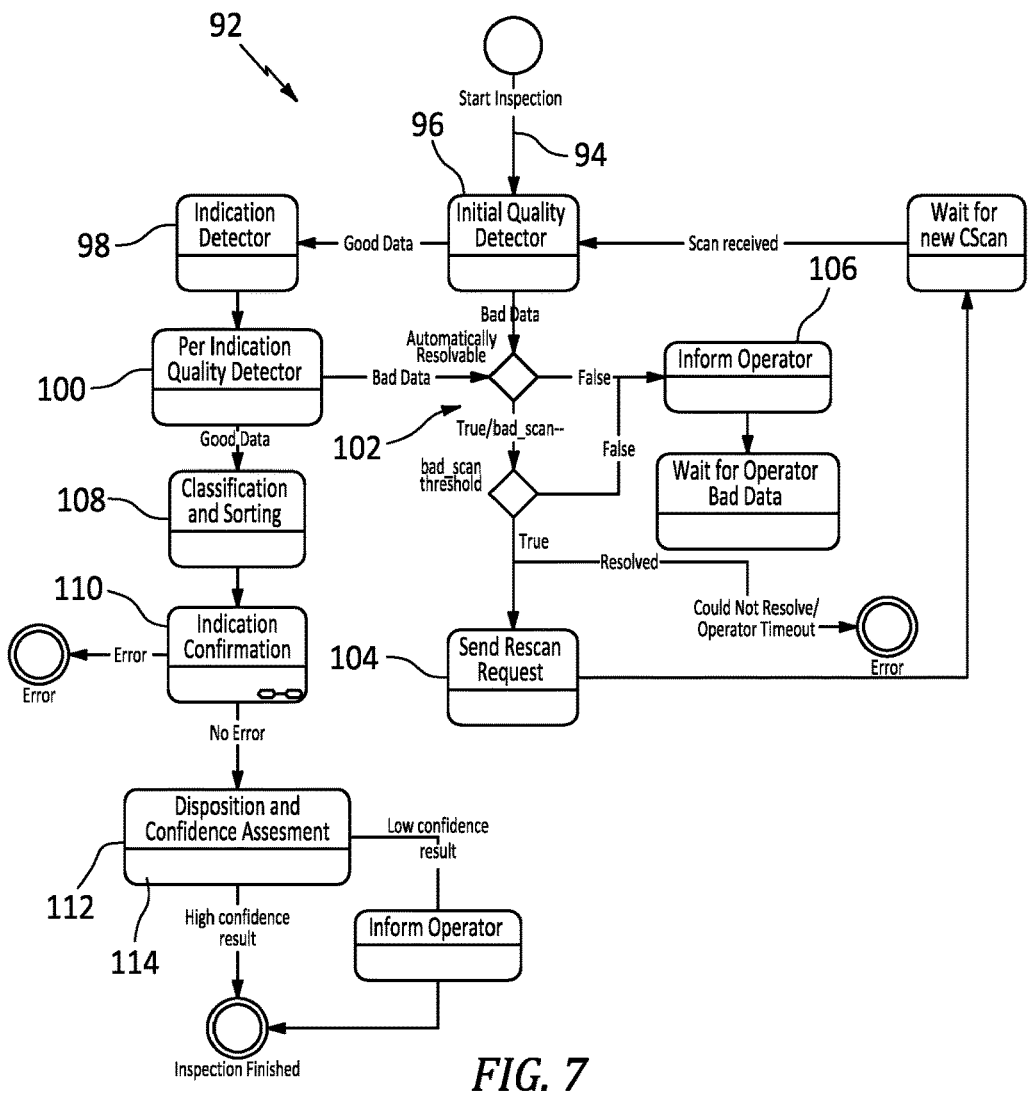
FIG. 7 is a schematic of an exemplary automatic defect recognition system workflow.

Referring also to FIG. 7, an exemplary automatic defect recognition system process flow diagram is shown. There can be two types of data that ADR processor 66 uses in the inspection process 92, C-scans and A-scans as detailed above. FIG. 7 shows the detailed flow of the processing of those scans 94 and description of situations requiring human 48 intervention (Inform Operator Block). The inspection process 92 starts at 96 by analyzing the C scan data for quality issues (for example, electrical noise, bubbles in the tank and the like). If the data is good, ADR processor 66 executes an algorithm to identify indications in the scan data at 98. At this point a second quality detector (per indication quality detector) 100 uses the A-scan associated with the identified indications as additional data to identify quality issues in the data.

If one of the quality detectors flags the data as bad, the process 92 goes into an error handling loop 102 to troubleshoot and resolve the data quality issues. If any of the scan data defects (resulting from 96 or 100) can be automatically resolved 102, then ADR processor 66 will send a command to the sonic tank 22 for resolving this issue (for instance, brushing the surface in case of a bubble issue). After the automatic resolution is executed successfully, ADR processor 66 will request a rescan 104 from the sonic tank 22. On the other hand, if the scan data defects cannot be resolved automatically or the there was an issue with automatically resolving it, the ADR processor 66 will involve the operator 48 at block 106 in order to perform some physical action (for example, brush bubbles off the part 26) before ADR processor 66 requests a rescan at 104. In the case where the operator cannot resolve the issue or did not respond on time (at "Wait for operator" blocks), the process 92 will go into the error state where ADR processor will stop the current part inspection and move on to the next part. There are other error handling mechanisms that take care of network issues that may arise and impact the communication of the ADR processor 66 and the sonic tank 22.

If both quality detectors pass the data, the indications are classified and sorted by severity at block 108. Indications are further confirmed at block 110 by collecting additional A-scan data at different angulations of the transducer 14. Finally, at 112 the disposition and confidence module assesses each confirmed indication and comes up with a disposition, for example reject the part as the amplitude of at least one indication is above prescribed rejection threshold.

Figure 8:
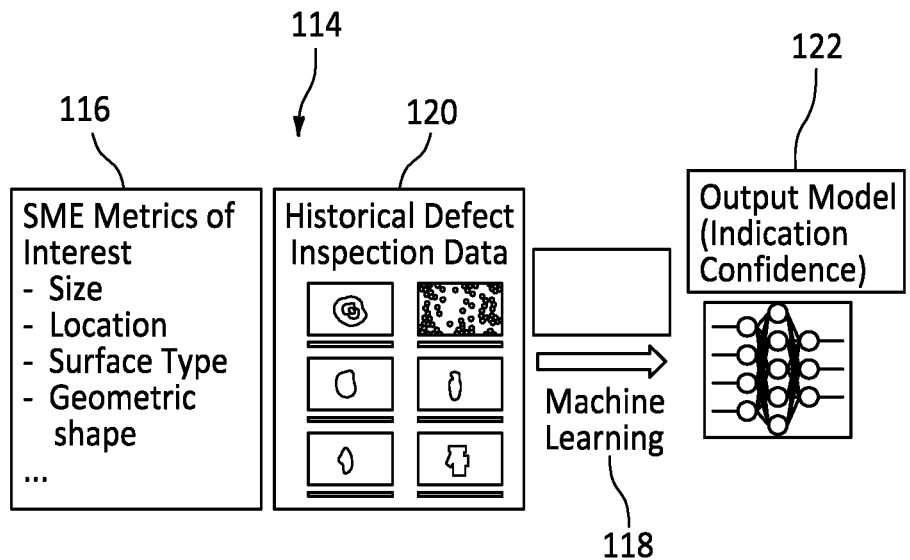
FIG. 8 is a schematic of an exemplary automatic defect recognition system indication confidence model.

An exemplary characteristic of the ADR processor 66 is the built-in confidence system 114 shown in "Disposition and Confidence Assessment" module 112 in FIG. 7. The confidence 114 in ADR processor 66 disposition is a combination of subject-matter-experts (SME) that identify the features of interest 116 in a detected indication that can possibly be a defect 28, and machine learning methods 118 that use historical defect characteristics 120 to get bounds that determine likelihood of an indication 122 to be a real subsurface defect as shown in FIG. 8. This knowledge provides the basis of the confidence system 114 that can provide a disposition such as high confidence pass/fail or low confidence pass/fail of the inspected part 26. The indication confidence model 122 depicted in FIG. 8 provides two outputs: 1) confidence: low or high and 2) a priority score which is a real number that provides a closeness metric of the evaluated indication to those indications from the historical training set 120.

Figure 9:
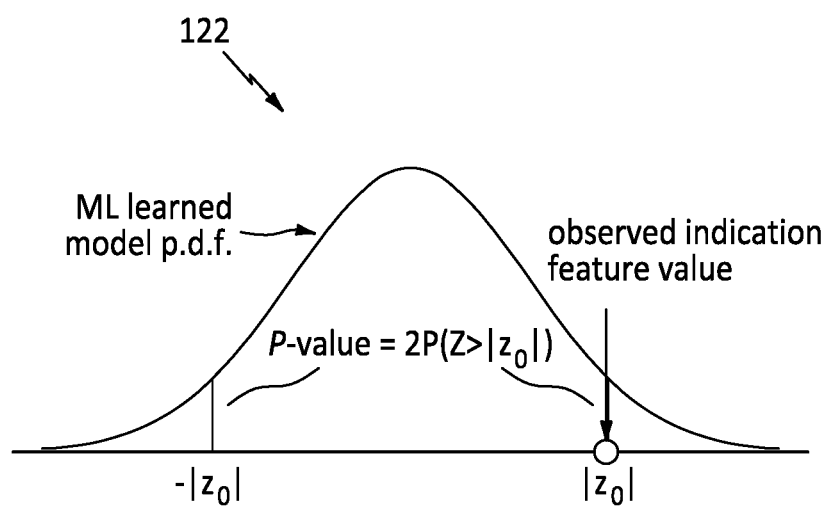
FIG. 9 is a schematic of an exemplary machine learning model and p-value for a 1-D feature.

In an exemplary embodiment one metric that can be used as a priority score is a p-value of the statistical model learned by the machine learning (ML) process 118. For a given number N of features (N-dimensional features), using the historical inspection data 120, the machine learning procedure 118 learns a statistical distribution function for the values, (for example, fitting mean and standard deviations of a multi-variate Gaussian distribution). For an observed indication with feature values equal to $Z_0$, one can use the p-value defined as p-value=2Prob $[Z>|z_0|]$ as a measure of how close this indication is to a real defect model learned using ML. The higher the p-value, the closer the indication features are to the feature learned by the ML model, hence the closer the value is to a real defect or discontinuity. As an illustration for the p-value metric, FIG. 9 provides a visual interpretation 122 of the p-value on a 1-D feature.

The confidence/prioritization model 114 can be described from a statistical standpoint. One can utilize the machine learning 118 process to learn a model for defects as a function of their features value; setup a null hypothesis ($H_0$): ADR detected indication follows the ML distribution; test the statistic: features values; the threshold of significance: define confidence threshold (for example, 0.05); observation o: an indication detected by the ADR system 66; Calculate p-value of observation O; reject the null hypothesis if the calculated p-value is below the threshold of significance and mark the indication as low confidence, or else accept the null hypothesis and mark the indication as high confidence.

A technical advantage of the process described for the confidence/scoring system 114 can be used for historical data analysis 120 to rank probability of a scanned part to have an ADR indication that is a real defect, hence human inspector 48 resources can be used efficiently for re-inspection purposes.

Another technical advantage of the disclosed process can include an efficient automated process which minimizes user involvement and invokes that only when necessary.

Another technical advantage of the disclosed process can include a unique method for confidence assessment along with indication scoring framework which allows for prioritization of user attention.

There has been provided a process. While the process has been described in the context of specific embodiments thereof, other unforeseen alternatives, modifications, and variations may become apparent to those skilled in the art having read the foregoing description. Accordingly, it is intended to embrace those alternatives, modifications, and variations which fall within the broad scope of the appended claims.

What is claimed is:

1. A system for detecting a sub-surface defect comprising:
   a transducer fluidly coupled to a part located in a tank containing a liquid configured to transmit ultrasonic energy, said transducer configured to scan said part to create scan data of the scanned part;
   a pulser/receiver coupled to said transducer configured to receive and transmit said scan data;
   a processor in electronic communication with said pulser/receiver, said processor configured to communicate with said pulser/receiver and collect said scan data; and said processor configured to detect said sub-surface defect;
   a tangible, non-transitory memory configured to communicate with said processor, the tangible, non-transitory memory having instructions stored therein that, in response to execution by the processor, cause the processor to perform operations comprising:
   receiving, by the processor, said scan data for said part from said transducer;
   running, by the processor, a flaw detection algorithm;
   determining, by the processor, a part disposition wherein said part disposition is based on a confidence system that the processor uses to self-assess said part disposition;
   detecting, by the processor, that both of C-scan data and A-scan data are good, an indication is classified and sorted, wherein the indication represents at least one of a sensed flaw in the part, the sub-surface defect and a discontinuity in the part; and
   creating, by the processor, a report.

2. The system according to claim 1, wherein the scan comprises transmitting ultrasonic energy to said part and receiving said ultrasonic energy from said part.

3. The system according to claim 1, wherein said flaw detection algorithm is based on at least one inspection technique sheet.

4. The system according to claim 3, wherein determining said part disposition is responsive to at least one of acceptance criteria defined in the technique sheet and the scan data.

5. The system according to claim 1, further comprising:
   providing, by the processor, further instructions to the transducer to maximize a signal-to-noise ratio to localize identified indications.

6. A process for detecting a sub-surface defect by use of a system including a transducer fluidly coupled to a part located in a tank containing a liquid configured to transmit ultrasonic energy, said transducer configured to scan said part to create scan data of the scanned part; a pulser/receiver coupled to said transducer configured to receive and transmit said scan data; a processor coupled to said pulser/receiver, said processor configured to communicate with said pulser/receiver and collect said scan data; and said processor configured to detect said sub-surface defect; a tangible, non-transitory memory configured to communicate with said processor, the tangible, non-transitory memory having instructions stored therein that, in response to execution by the processor, cause the processor to perform operations comprising:
   receiving, by the processor, said scan data for said part from said transducer, wherein said scan data comprises C-scan data and A-scan data;
   running, by the processor, a flaw detection algorithm;
   determining, by the processor, a part disposition; and
   creating, by the processor, a report;
   analyzing, by the processor, C-scan data for quality issues, wherein upon an identification that said C-scan data is acceptable, the processor executes an algorithm to identify an indication in the scan data, wherein the indication represents at least one of a sensed flaw in the part, the sub-surface defect and a discontinuity in the part;
   analyzing, by the processor, an A-scan associated with the indication as additional scan data to identify quality issues in the scan data; and
   detecting, by the processor, that both of the C-scan data and the A-scan data are good, the indication is classified and sorted.

7. The process according to claim 6, further comprising:
   detecting, by the processor, that at least one of the C-scan data and the A-scan data is bad, executing, by the processor, an error handling loop to troubleshoot and resolve the quality issues in the scan data.

8. The process according to claim 6, further comprising:
confirming, by the processor, the indication by collecting additional A-scan data at different angulations of the transducer.

9. The process according to claim 6, further comprising:
assessing, by the processor, a confirmed indication and providing a disposition for the indication; wherein the disposition comprises a combination of:
information from subject-matter-experts that identify features of interest in a detected indication that can be a defect, and
a machine learning method that uses historical defect characteristics to get bounds that determine a likelihood of an indication to be a subsurface defect.

10. A process for detecting a sub-surface defect by use of a system including a transducer fluidly coupled to a part located in a tank containing a liquid configured to transmit ultrasonic energy, said transducer configured to scan said part to create scan data of the scanned part; a pulser/receiver coupled to said transducer configured to receive and transmit said scan data; a processor coupled to said pulser/receiver, said processor configured to communicate with said pulser/receiver and collect said scan data; and said processor configured to detect said sub-surface defect, a tangible, non-transitory memory configured to communicate with said processor, the tangible, non-transitory memory having instructions stored therein that, in response to execution by the processor, cause the processor to perform operations comprising:

receiving, by the processor, said scan data for said part from said transducer, wherein said scan data comprises at least one of C-scan data and A-scan data;
running, by the processor, a flaw detection algorithm;
determining, by the processor, a part disposition; and
creating, by the processor, a report;
analyzing, by the processor, C-scan data for quality issues, wherein upon an identification that said C-scan data is acceptable, the processor executes an algorithm to identify an indication in the scan data, wherein the indication represents at least one of a sensed flaw in the part, the sub-surface defect and a discontinuity in the part;
analyzing, by the processor, an A-scan associated with the indication as additional scan data to identify quality issues in the scan data;
detecting, by the processor, that both of the C-scan data and the A-scan data are good, the indication is classified and sorted;
assessing, by the processor, a confirmed indication and providing a disposition for the indication; wherein the disposition comprises a combination of:
information from subject-matter-experts that identify features of interest in a detected indication that can be a defect, and
a machine learning method that uses historical defect characteristics to get bounds that determine a likelihood of an indication to be a subsurface defect.

\* \* \* \* \*